2,746,937

PROCESS OF PREPARING PLATINUM-ALUMINA HYDROFORMING CATALYSTS

Edward A. Hunter and Charles N. Kimberlin, Jr., Baton Rouge, La., assignors to Esso Research and Engineering Company, a corporation of Delaware No Drawing. Application May 1, 1951, Serial No. 224,065

4 Claims. (Cl. 252—466)

This invention relates to improved hydroforming catalysts comprising platinum or palladium and more particularly to a novel method of preparing platinum- and palladium-containing catalysts.

Catalysts containing platinum distributed upon a variety of carriers or supports have been described for various processes in the prior art. Use thereof in hydrocarbon conversions has not been particularly widespread, however, because of the relatively high cost of the platinum and also because of the difficulty of preparing the catalyst in a form which is sufficiently active for the conversion and which is not adversely affected by contaminants in the hydrocarbon feed stock. Greensfelder U. S. Patent No. 2,317,683 discloses the addition of small amounts of platinum or palladium as a promoter to chromia-alumina cyclizing catalysts. U. S. Patent 2,478,916 discloses a process for reforming straight run gasolines in contact with catalysts prepared by compositing platinum or palladium with a dry cracking component such as silica-alumina, silica-magnesia, silica-zirconia or the like. U. S. Patent No. 2,479,109 discloses the preparation of catalysts by combining a halogen with precipitated alumina and incorporating platinum in the halogen-containing alumina while U. S. Patent No. 2,479,110 discloses the reforming of naphtha fractions with the catalysts prepared in this way. The activity of these platinum-containing catalysts is subject to substantial variation depending upon the manner in which the catalyst compositions are prepared. This field has been the subject of intensive investigation in an effort to prepare compositions having improved activity and/or stability.

It is the object of this invention to devise a novel method for preparing platinum- or palladium-containing catalyst compositions.

It is also the object of this invention to devise a new method for preparing platinum-alumina or palladium-alumina composite catalysts of high activity and stability in a simple, facile manner.

Another object of this invention is the novel catalysts prepared by the method described hereinafter.

It is a further object of this invention to hydroform naphtha or gasoline fractions in contact with the catalysts prepared as described hereinafter.

These and other objects will appear more clearly from the detailed specification and claims which follow.

It has now been found that catalysts which are especially effective for the hydroforming of naphtha fractions may be prepared by mixing an alumina sol, preferably an alumina sol prepared from an aluminum alkoxide, with a platinum- or palladium-containing solution, to which there is preferably added sufficient halogen compound to provide 0.1 to 4 wt. per cent of a halogen in the final catalyst composition and converting the platinum or palladium compound to the metal either by treatment with hydrogen sulfide, drying and heating in the presence of a reducing gas or, in the event that the platinum or palladium compound is readily decomposed by heating, then by merely heating to decompose the said compound and, if necessary activating the composition by heating to elevated temperatures of about 800° to 1000° F. or passing a reducing gas over the composite at temperatures of about 500° to 1000° F. until the composite shows the desired activity.

The alumina sols which may be used in accordance with the present invention are pure sols such as are obtainable by the treatment of a metallic aluminum with a dilute solution of acetic acid in the presence of a small amount of mercury or mercury compound, or preferably as prepared by hydrolysis of an aluminum alkoxide such as aluminum ethylate, aluminum isopropylate, aluminum butylate, aluminum amylate, and the like. An aluminum alkoxide derived from a water insoluble alcohol is preferred because of the ease of recovery of the insoluble alcohols for re-use. These alkoxides of aluminum may be converted into alumina hydrosol in the manner described in co-pending application Serial No. 214,158, filed March 6, 1951. This is accomplished by adding a small amount of a peptizing agent such as glacial acetic acid to the aluminum alkoxide dissolved in an excess of alcohol or in a hydrocarbon solvent followed by hydrolysing the aluminum alkoxide containing the peptizing agent by vigorously mixing with water, preferably at about 150–200° F. and recovering the alumina hydrosol thus produced. The alumina sol should contain about 1 to 6 wt. per cent $Al_2O_3$. The preferred alumina hydrosols comprise alumina in an extremely high degree of dispersion and show no tendency to settle upon standing in a quiescent state. Such sols are transparent in layers of an inch or less. Upon drying, this preferred sol produces a clear, glassy alumina gel in contrast to the chalky gel produced by the various peptized precipitates of alumina.

The platinum or palladium may be added to the alumina sol in any desired manner. For example a solution of chloroplatinic acid, ammonium chloroplatinate or palladium chloride may be prepared and mixed with the alumina sol either by itself or in admixture with hydrogen fluoride or other fluorine compound or with hydrochloric acid and then treated with hydrogen sulfide to fix the catalytic metal or the composite may be heated to convert the catalytic metal compound. Alternatively the platinum or palladium salt solution may be treated with hydrogen sulfide and the resultant brown solution then may be mixed with the alumina sol. The platinum or palladium compound should be added to the alumina sol in sufficient amount that the final catalyst contains from 0.1 to 4 wt. per cent of platinum or palladium, preferably from 0.2 to 1 wt. per cent of platinum or from 0.5 to 3 wt. per cent of palladium.

It is desirable to incorporate from about 0.1 to 4 wt. per cent of a halogen, preferably fluorine in the catalyst composition. This may be accomplished by adding hydrogen fluoride, hydrochloric acid or a halogen compound such as ammonium fluoride, ammonium acid fluoride, aluminum chloride or the like to the platinum or palladium solution before compositing the same with the alumina sol, or it may be added to the platinum- or palladium-containing sol. It is also possible to set the platinum- or palladium-containing sol to hydrogel and then treat the resultant hydrogel with the halogen.

Alternatively the sol containing the salt of platinum and/or palladium may be dried and the dry gel treated with gaseous or aqueous halogen acid.

Catalysts of improved stability are obtained by the addition of 1 to 10 per cent of various oxides. For example silica hydrosol, chromic acid, or zirconyl acetate may be added to the alumina hydrosol in amounts sufficient to give 1 to 10 per cent of silica, chromia or zirconia, respectively, in the finished catalyst.

After adding the platinum and/or palladium compounds to the alumina sol and after adding the desired promoters, stabilizers or reducing agents the finished catalyst is produced by drying at about 200° to 400° F. Before use for reforming, it is preferred to activate the catalyst by treatment with hydrogen at 500° to 1000° F. for 1 to 3 hours.

The following examples are illustrative of the present invention.

Example 1

864 g. aluminum metal turnings dissolved in a 50–50 mixture of pentasol (isomeric amyl alcohols sold by Sharples Chemical Co.) and a 240° to 280° F. petroleum naphtha cut. A catalytic amount of $HgCl_2$ (1 $HgCl_2$:1000 Al weight ratio) is added to promote the reaction.

When the reaction is complete, there is added with vigorous agitation 544 g. glacial acetic acid.

The solution of aluminum amylate containing acetic acid is then hydrolyzed by contacting with 117 lbs. of water heated to about 180° F. The hydrolysis is carried out by contacting the two in equivalent proportions discharged onto the face of the impeller of a centrifugal pump.

The mixture is then discharged into a vessel and allowed to stand for 10 minutes, during which time it separates into two layers. The upper non-aqueous layer comprises the major portion of the alcohol and hydrocarbon used, which is here drawn off and dried for re-use in reaction with additional aluminum metal. The lower aqueous phase comprises an alumina hydrosol containing about 3 per cent by wt. of $Al_2O_3$ and about 1 per cent by wt. of acetic acid.

This hydrosol is then charged to a stripping vessel and heated to take over-head any residual alcohol or hydrocarbon in the sol. Any water taken over-head may be returned to the hydrosol.

The product hydrosol is clear and dries to form a transparent glossy gel.

10 liters of this alumina hydrosol containing about 310 g. $Al_2O_3$ were charged to a crock. There was then added thereto with mild agitation at room temperature the following mixture—6.57 g. of 48 per cent aqueous HF (3.15 g. HF) and 43.2 g. of 10 per cent aqueous $H_2PtCl_6 \cdot 6H_2O$ (1.63 g. Pt). Localized gelatin took place during this addition. The mixture was agitated overnight to homogenize the same.

The mixture was treated by bubbling a vigorous stream of hydrogen sulfide through it for 30 minutes. Sufficient 28 per cent aqueous $NH_3$ was added to the sulfided mixture to adjust its pH to between 5.0 and 6.0. The mixture was dried in a forced draft oven at 250° F. The resultant catalyst had a nominal composition 98.5 $Al_2O_3$—0.5 Pt—1.0 HF.

Example 2.—Hydroforming test data

The catalyst of Example 1 was ground and formed by compression into $3/16''$ x $3/16''$ cylindrical tablets. This material was charged to a fixed bed testing unit and activated by heating for 12 hours at 900° F. under a hydrogen atmosphere at 200 p. s. i. g. Hydroforming was then initiated using a 200°–330° F. virgin naphtha cut (CFR-Res. O. N.=49.4) at 900° F., 200 p. s. i. g. pressure, 1 v./v./hr., and 6000 cu. ft. hydrogen per bbl. of feed. The reaction mixture was passed over the catalyst for 3 hours when the feed was discontinued and the hydrogen flow continued at the same rate and conditions for 6 hours to regenerate the catalyst. This operation was continued for 5 cycles and the liquid product composited for examination.

Vol. per cent yield, $C_4$—430° F. vapor temperature  87.3
CFR-Res. Octane Number, clear_____ 100.9

Example 3

12 liters of 3.0 per cent alumina hydrosol prepared as in Example 1 (360 g. $Al_2O_3$) is agitated in a crock with a lightning mixer and to it is added 19.1 g. of 10 per cent aqueous $H_2PtCl_6 \cdot 6H_2O$ (0.72 g. Pt). Agitation is continued 30 minutes and the hydrosol is then dried at 240° F. to form an active gel catalyst; nominal composition 99.8 $Al_2O_3$–0.2 Pt.

Example 4

12 liters of 3.0 per cent $Al_2O_3$ hydrosol prepared as in Example 1 (360 g. $Al_2O_3$) is agitated, and to it is added 95.5 g. 10 per cent aqueous $H_2PtCl_6 \cdot 6H_2O$ (3.6 g. Pt). Agitation is continued 30 minutes and to the mixture is added 3.95 g. 48 per cent aqueous hydrogen fluoride (1.8 g. HF). Localized gelation occurs during addition of the HF. The mixture is agitated overnight to increase its homogeneity and is then dried overnight to produce a finished gel catalyst comprising 98.5 $Al_2O_3$—1 Pt—0.5 HF.

Example 5

12 liters of 3 per cent $Al_2O_3$ hydrosol prepared as in Example 1 (360 g. $Al_2O_3$) is agitated, and to it is added 47.8 g. of 10 per cent aqueous $H_2PtCl_6 \cdot 6H_2O$ (1.8 g. Pt). With continued agitation, a vigorous stream of hydrogen sulfide is bubbled through the mixture for 30 minutes, producing a deep brown coloration. The mixture is then dried at 250° F. to produce a gel catalyst comprising 99.5 $Al_2O_3$—0.5 Pt.

Example 6

12 liters of 3 per cent $Al_2O_3$ hydrosol prepared as in Example 1 (360 g. $Al_2O_3$) is vigorously agitated, and to it is added:

1). 631 cc. purified 3 per cent $SiO_2$ hydrosol (18.9 g. $SiO_2$) prepared by contacting sodium silicate with an acid-regenerated cation exchange resin (Amberlite IR–120 manufactured by Rohm and Haas).
2). 50.5 g. 10 per cent aqueous $H_2PtCl_6 \cdot 6H_2O$ (1.9 g. Pt).

The mixture is dried at 250° F. to produce a gel catalyst comprising 94.5 $Al_2O_3$—5 $SiO_2$—0.5 Pt.

Example 7

12 liters of 3 per cent $Al_2O_3$ hydrosol prepared as in Example 1 (360 g. $Al_2O_3$) is vigorously agitated and to it is added:

1). 47.8 g. 10 per cent aqueous $H_2PtCl_6 \cdot 6H_2O$ (1.8 g. Pt).
2). 500 cc. 10 per cent aqueous formaldehyde.

This mixture is dried at 250° F. to yield a glossy gel catalyst comprising 99.5 $Al_2O_3$—0.5 Pt.

Example 8

15 liters $Al_2O_3$ hydrosol prepared as in Example 1 (450 g. $Al_2O_3$) is vigorously agitated and to it is added a solution of 15.3 g. $PdCl_2$ (9.2 g. Pd) in 500 cc. water. The mixture is then dried at 250° F., to yield a glossy gel catalyst comprising 98 $Al_2O_3$—2 Pd.

The platinum- and/or palladium-containing catalysts prepared in accordance with the present invention are particularly suitable for hydroforming hydrocarbon fractions boiling within the motor fuel range. In such hydroforming operations the temperature is usually between 600° and 1000° F., preferably 800–950° F., the pressure between atmospheric and 1000 lbs. per sq. inch, the feed rate at about 0.25 to about 4.0 v./v./hr. (volumes of liquid feed naphtha per volume of catalyst per hour) preferably 1 to 2 v./v./hr. Hydrogen or hydrogen-rich recycle gas is circulated through the reaction zone at a rate of about 2000–12,000, preferably 6000 cu. ft. per barrel of feed. The hydrogen-rich recycle gas contains at least about 60 vol. per cent hydrogen preferably 80–99 per cent hydrogen by volume. The catalysts prepared as described above give good results at high pressures of from 500–1000 lbs. per sq. inch but they are especially effective at low pressures of the order of from 50 to 250 lbs. per sq. inch.

What is claimed is:

1. A process for manufacturing platinum-alumina and palladium-alumina catalysts which comprises preparing an alumina hydrosol by treating aluminum metal with a dilute acid in the presence of catalytic amounts of mercury, mixing a compound of a metal selected from the group consisting of platinum and palladium with said alumina hydrosol, drying and calcining the resultant product and treating the calcined mixture with hydrogen to activate the same.

2. A process for manufacturing platinum-alumina and palladium-alumina catalysts which comprises preparing an alumina hydrosol by hydrolizing an aluminum alkoxide, mixing a compound of a metal selected from the group consisting of platinum and palladium with said alumina hydrosol, drying and calcining the resultant product and treating the calcined mixture with hydrogen to activate the same.

3. A process for manufacturing platinum-alumina and palladium-alumina catalysts which comprises preparing an alumina hydrosol by treating aluminum metal with a dilute acid in the presence of catalystic amounts of mercury, mixing a compound of a metal selected from the group consisting of platinum and palladium with said alumina hydrosol, treating this mixture with hydrogen sulfide, drying and calcining the resultant product and treating the calcined mixture with hydrogen to activate the same.

4. A process for manufacturing platinum-alumina and palladium-alumina catalysts which comprises preparing an alumina hydrosol by hydrolizing an aluminum alkoxide, mixing a compound of a metal selected from the group consisting of platinum and palladium with said alumina hydrosol, treating this mixture with hydrogen sulfide, drying and calcining the resultant product and treating the calcined mixture with hydrogen to activate the same.

References Cited in the file of this patent

UNITED STATES PATENTS

| | | |
|---|---|---|
| 2,479,109 | Haensel | Aug. 16, 1949 |
| 2,479,110 | Haensel | Aug 16, 1949 |

FOREIGN PATENTS

| | | |
|---|---|---|
| 396,712 | Great Britain | Aug. 8, 1933 |
| 477,026 | Great Britain | Dec. 16, 1937 |